United States Patent
Abbasi et al.

(10) Patent No.: US 7,415,266 B1
(45) Date of Patent: *Aug. 19, 2008

(54) METHOD AND APPARATUS FOR PROVIDING PRE-PAY AND POST-PAY COMMUNICATION SERVICES USING THE SAME INTEGRATED SYSTEM

(75) Inventors: Zahid Abbasi, Overland Park, KS (US); Minh Duy Khuc, Fremont, CA (US); Carl Rogers, Lenexa, KS (US); Isaac Shane Allen, Lee's Summit, MO (US); Dan Sbisa, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 909 days.

This patent is subject to a terminal disclaimer.

(21) Appl. No.: 10/350,687

(22) Filed: Jan. 24, 2003

Related U.S. Application Data

(63) Continuation of application No. 09/596,874, filed on Jun. 19, 2000, now Pat. No. 6,535,727.

(51) Int. Cl.
*H04M 11/00* (2006.01)
*H04M 15/00* (2006.01)

(52) U.S. Cl. .................... 455/406; 455/414.1; 455/410; 455/426.1; 379/115.01; 379/112.01

(58) Field of Classification Search ................. 455/406, 455/410, 414.1, 426.1, 408, 414; 379/115.01, 379/112.01, 114.2
See application file for complete search history.

(56) References Cited

U.S. PATENT DOCUMENTS

| | | | | |
|---|---|---|---|---|
| 4,198,545 A | * | 4/1980 | Haist et al. .................. | 379/133 |
| 5,991,379 A | * | 11/1999 | Kusaki et al. .......... | 379/115.01 |
| 6,035,025 A | * | 3/2000 | Hanson .................... | 379/114.2 |
| 6,044,247 A | * | 3/2000 | Taskett et al. ............ | 379/114.2 |
| 6,167,119 A | * | 12/2000 | Bartholomew et al. . | 379/221.09 |

(Continued)

Primary Examiner—Lana N. Le

(57) ABSTRACT

A method and apparatus are disclosed for providing pre-pay and post-pay calls. After receiving a pre-pay call, an integrated service platform obtains and transfers a pre-pay destination number and a pre-pay validation parameter to a switching system. The switching system then releases the pre-pay call extension to the integrated service platform and extends the pre-pay call using the pre-pay destination number. As the pre-pay call is in progress, the switching system monitors a duration of the pre-pay call and terminates the pre-pay call if the duration meets or exceeds a pre-pay amount indicated by the pre-pay validation parameter. In this manner, integrated service platforms, as required by prior approaches, are no longer required to be connected to the pre-pay call for the entire duration of the pre-pay call. Rather, an integrated service platform can request and receive authorization and call destination information, then be released for use by other calls. After receiving the post-pay call, the integrated service platform obtains and transfers a post-pay destination number and a post-pay validation parameter to the switching system. The switching system then releases the post-pay call extension to the integrated service platform and extends the post-pay call using the post-pay destination number if the post-pay validation parameter allows the post-pay call. One advantage for post-pay calls is the provision of post-pay calls service such as messaging and validation is centralized in the integrated service platform, which reduces the time and cost of maintaining the post-pay service.

33 Claims, 10 Drawing Sheets

U.S. PATENT DOCUMENTS

| | | | |
|---|---|---|---|
| 6,208,851 B1 * | 3/2001 | Hanson ........................ | 455/406 |
| 6,246,757 B1 * | 6/2001 | Cai et al. .................... | 379/114.2 |
| 6,320,947 B1 * | 11/2001 | Joyce et al. ............... | 379/114.2 |
| 6,324,528 B1 * | 11/2001 | Hillson et al. ............ | 379/114.28 |
| 6,373,930 B1 * | 4/2002 | McConnell et al. ..... | 379/114.28 |
| 6,393,269 B1 * | 5/2002 | Hartmaier et al. ........... | 455/406 |
| 6,463,275 B1 * | 10/2002 | Deakin ....................... | 455/406 |
| 6,535,727 B1 * | 3/2003 | Abbasi et al. .............. | 455/414.1 |
| 6,760,418 B1 * | 7/2004 | Abbasi et al. ........... | 379/115.01 |
| 6,847,708 B1 * | 1/2005 | Abbasi et al. ................ | 455/408 |
| 2001/0043697 A1 * | 11/2001 | Cox et al. ............... | 379/115.01 |
| 2002/0150223 A1 * | 10/2002 | Heinmiller et al. ..... | 379/114.01 |
| 2005/0100149 A1 * | 5/2005 | Abbasi et al. ................ | 455/414 |
| 2005/0129208 A1 * | 6/2005 | McGrath et al. ........ | 379/115.01 |

* cited by examiner

METHOD AND APPARATUS FOR PROVIDING PRE-PAY AND POST-PAY COMMUNICATION SERVICES USING THE SAME INTEGRATED SYSTEM

RELATED APPLICATIONS

This application is a continuation of U.S. patent application Ser. No. 09/596,874, filed Jun. 19, 2000, entitled "Method and Apparatus for Providing Pre-Pay and Post-Pay Communication Services Using the Same Integrated System," which is hereby incorporated by reference.

FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to communication networks, and more particularly, to a system for providing pre-pay and post-pay calls using an integrated service platform connected for a portion of the calls.

2. Description of the Prior Art

As is the case for most businesses, telecommunication service providers desire to increase their profits. Typically, profits are increased by offering new products and services, and by reducing costs associated with providing products and offering services. Communication service providers typically offer services on a very large scale, such as on a nationwide basis. In this environment, communication providers can substantially reduce costs by decreasing the number of network resources required for offering a service.

Communication providers today offer many types of communication services, including pre-pay and post-pay calling card services. In a pre-pay calling card service, a caller obtains a pre-pay account with an amount such as monetary amount or a period of time that is debited against when a pre-pay call is made. Typically, a caller calls an 800 number to place the pre-pay call and enters the pre-pay account number and destination phone number. In a post-pay calling card service, the caller pays for the post-pay call after the post-pay account is charged with the post-pay call and the caller is billed. With some post-pay calling card services, there is a credit limit that is not to be exceeded for a post-pay account. Current implementations of these services require different platforms, despite the similar functions being performed to implement these services. For example, current implementations of pre-pay and post-pay calling card services use separate and distinct validation servers.

FIG. 1 depicts a system level block diagram for prior solutions of pre-pay calling card services, post-pay calling card services, and "connect to resource" services. FIG. 2 depicts a message sequence chart for a prior solution of providing pre-pay calling card services. In FIG. 2, a first switch 110 receives a pre-pay call over a link 102. The first switch 110 then processes the pre-pay call and transmits a route query for a Service Control Point (SCP) 150 via a link 106, a signal transfer point 140, and a link 108. The first switch 110 receives a routing instruction from the SCP 150. Using information from the routing instruction, the first switch 110 routes the pre-pay call to a service platform 160 via a link 112, a third switch 130, and a link 128. The service platform 160 then collects the digits from the pre-pay call for the pre-pay account code and destination number. The service platform 160 validates and rates the collected digits. If the pre-pay account code and destination number are valid, the service platform 160 extends the pre-pay call to the destination phone via the link 128, the third switch 130, a link 126, a second switch 120 and a link 124. The service platform 160 monitors a duration of the pre-pay call and terminates the pre-pay call if the call duration exceeds the number of remaining units on the pre-pay account. One disadvantage with this solution is the pre-pay call is extended through the first switch 110, third switch 130, the service platform 160, and the second switch 120. Thus, many network resources are utilized, which unnecessarily burdens the service platform 160 and the $3^{rd}$ switch 130 for the pre-pay call to reach its destination.

FIG. 3 depicts a message sequence chart for a prior solution of providing post-pay calling card services. In FIG. 3, the first switch 110 receives the post-pay call over the link 102. The first switch 110 then processes the post-pay call. The first switch 110 collects the digits from the post-pay call for a post-pay account code and a post-pay destination number. The first switch 110 then transmits a validate code query for the SCP 150 via the link 106, the signal transfer point 140, and the link 108. The first switch 110 receives a validate code response from the SCP 150. If the post-pay account code is valid based on the validate code response, the first switch 110 extends the post-pay call to the destination phone via a link 114, the second switch 120, and the link 124. Once the post-pay call is completed, the first switch 110 generates billing information for the post-pay account code. The disadvantage with this solution is the maintenance and cost problems of providing the post-pay call service. In this solution, the first switch 110 performs the majority of the post-pay call service such as collecting digits and validating caller digits. Thus, a simple change in post-pay call service would have large costs to distribute the change to each switch that performs post-pay call service.

FIG. 4 depicts a message sequence chart for a prior solution of providing "connect to resource" call processing services. In FIG. 4, the first switch 110 receives the call over the link 102 from a user that requires voice response interaction before the call is connected to the called destination. The first switch 110 then processes the call and transmits a route query for the SCP 150 via the link 106, the signal transfer point 140, and the link 108. The first switch 110 receives a routing instruction from the SCP 150 that routes the call from the first switch 110 to the service platform 160. The SCP 150 also transmits a context message containing call information to the service platform 160 via the link 116. Using information from the routing instruction, the first switch 110 routes the call to the service platform 160 via the link 112, the third switch 130, and the link 128. After receiving the call and the context information from the SCP 150, the service platform 160 plays a prompt message and collects information from the caller. The service platform 160 processes the call by processing the information and sending a transfer request message to the SCP 150 via the link 116. The SCP 150 processes the transfer request message and transmits a destination instruction to the first switch 110 via the link 108, the signal transfer point 140, and the link 106. The first switch 110 then disconnects the call between the first switch and the service platform 160 and extends the call to the destination phone via the link 114, the second switch 120, and the link 124.

The "connect to resource" solution is further described in a pending U.S. patent application Ser. No. 09/063,902 entitled "Telecommunications Resource Connection and Operation Using a Service Control Point", filed on Apr. 21, 1998, and is hereby incorporated by reference.

Current pre-pay and post-pay implementations do not provide enough flexibility for providing new services, such as providing customized greetings that are easily and dynamically changeable. Currently, post-pay call greetings are played to a customer by a switching system and a voice response unit, which cause the greetings to be very expensive to change, and do not provide enough flexibility.

SUMMARY OF THE INVENTION

The invention solves the above problem by providing pre-pay calls and post-pay calls using an integrated service platform. In accord with the invention the switching system receives a pre-pay call and extends the pre-pay call to the integrated service platform. The integrated service platform obtains a pre-pay destination number and a pre-pay validation parameter for the pre-pay call. The integrated service platform transfers the pre-pay destination number and the pre-pay validation parameter to the switching system. The switching system releases the pre-pay call extension to the integrated service platform and extends the pre-pay call using the pre-pay destination number. During the pre-pay call, the switching system monitors a duration of the pre-pay call and terminates the pre-pay call if the duration exceeds a pre-pay amount indicated by the pre-pay validation parameter.

For post-pay calls, the switching system receives a post-pay call and extends the post-pay call to the integrated service platform. The integrated service platform obtains a post-pay destination number and a post-pay validation parameter for the post-pay call. The integrated service platform transfers the post-pay destination number and the post-pay validation parameter to the switching system. The switching system releases the post-pay call extension to the integrated service platform and extends the post-pay call using the post-pay destination number if the post-pay validation parameter allows the post-pay call.

One advantage of the invention for pre-pay calls is the pre-pay call is no longer extended to the integrated service platform for the entire duration of the pre-pay call. Thus, network resources used to extend the call to the integrated service platform are freed up to handle other communication traffic. Also, the integrated service platform itself is freed to handle other pre-pay and post-pay calls. One advantage for post-pay calls is the provision of post-pay calls such as messaging and validation is centralized. Thus, changes in post-pay call service can be accomplished quickly and with reduced costs. The combination of pre-pay and post pay call service in one integrated service platform provides companies with an easier solution to alter both pre-pay and post-pay call services. Also, the support systems for pre-pay and post-pay services such as validation systems are combined into a single integrated support system. The time and costs to modify pre-pay and post-pay support services can then be reduced.

Moreover, in an embodiment of the present invention, a custom message or greeting is played by the integrated service platform on the call. In various embodiments, the custom greeting is determined based on the number dialed from the originating communication device, the telephone number of the destination communication device, or some combination of these parameters, as well as being based on various other criteria as would be understood by one skilled in the art.

DETAILED DESCRIPTION OF THE PREFERRED EMBODIMENT

Figure 1:
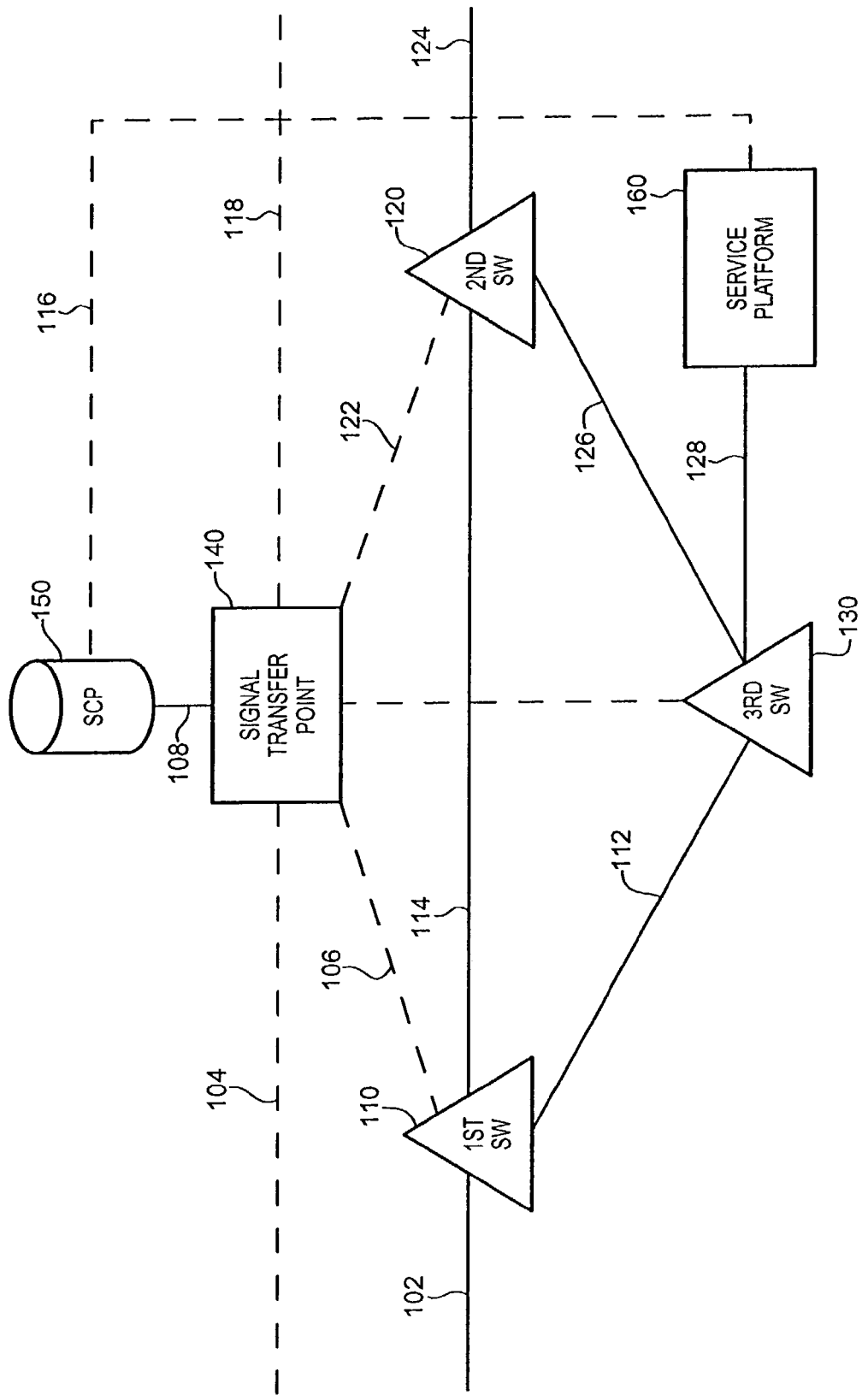
FIG. 1 is a system level block diagram for prior solutions of pre-pay calling card services, post-pay calling card services, and "connect to resource" services.
Figure 2:
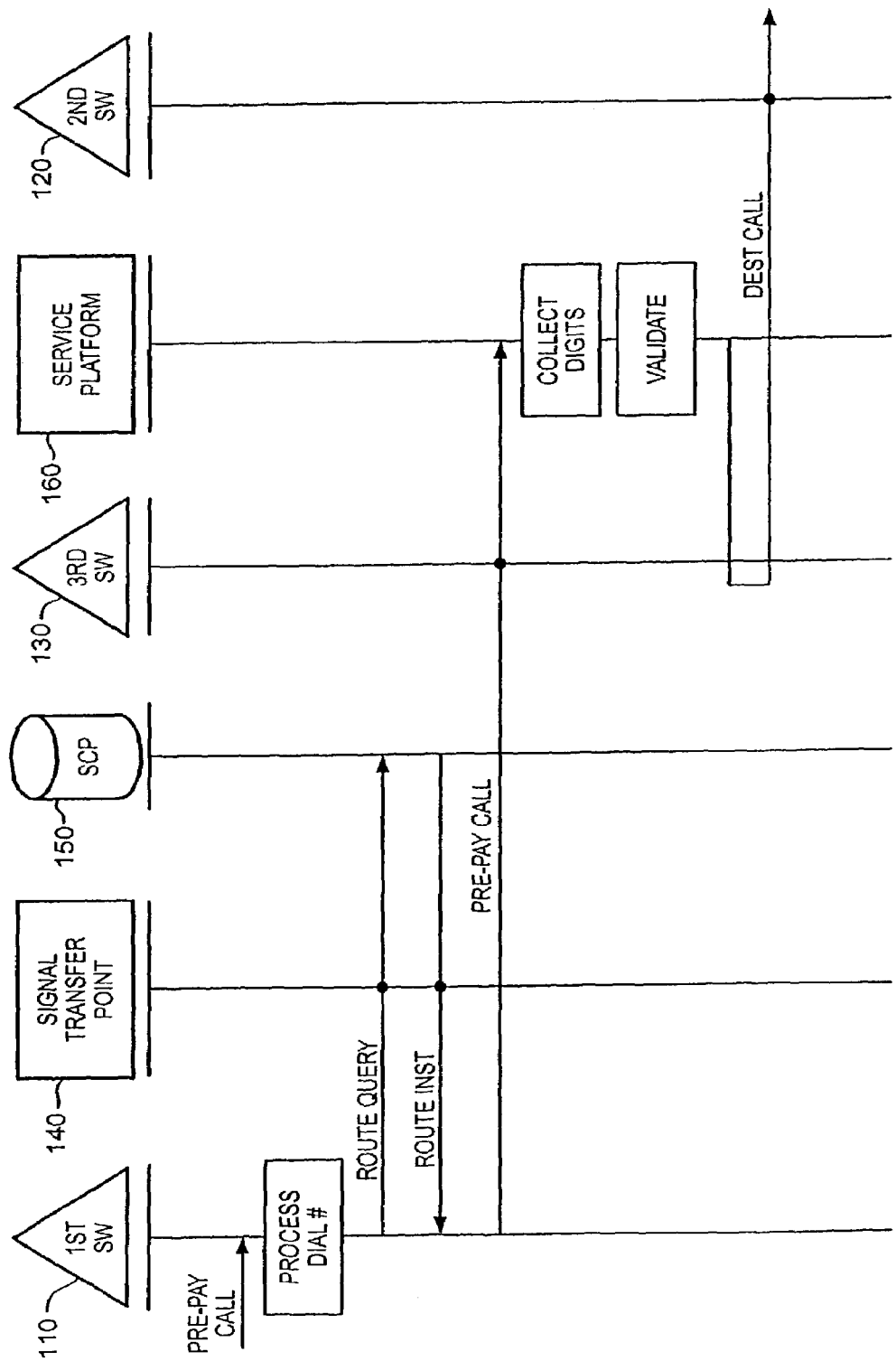
FIG. 2 is a message sequence chart for a prior solution of providing pre-pay calling card services.
Figure 3:
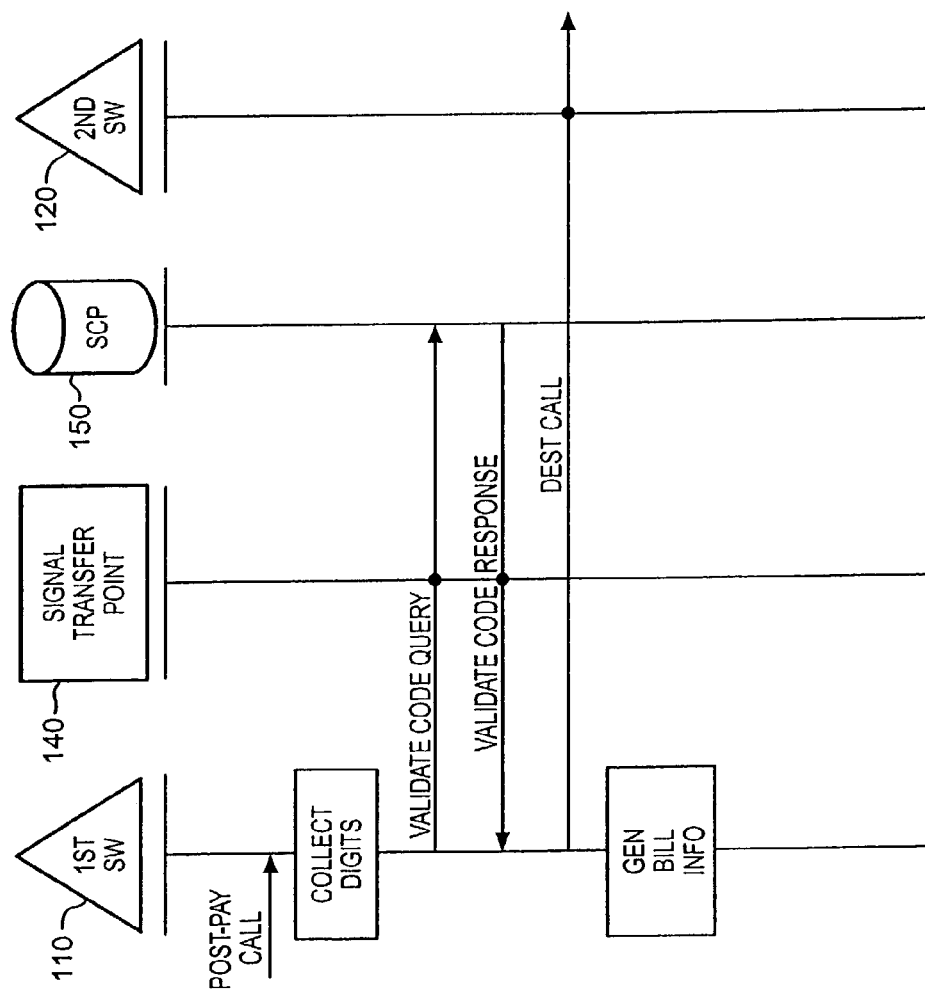
FIG. 3 is a message sequence chart for a prior solution of providing post-pay calling card services.
Figure 4:
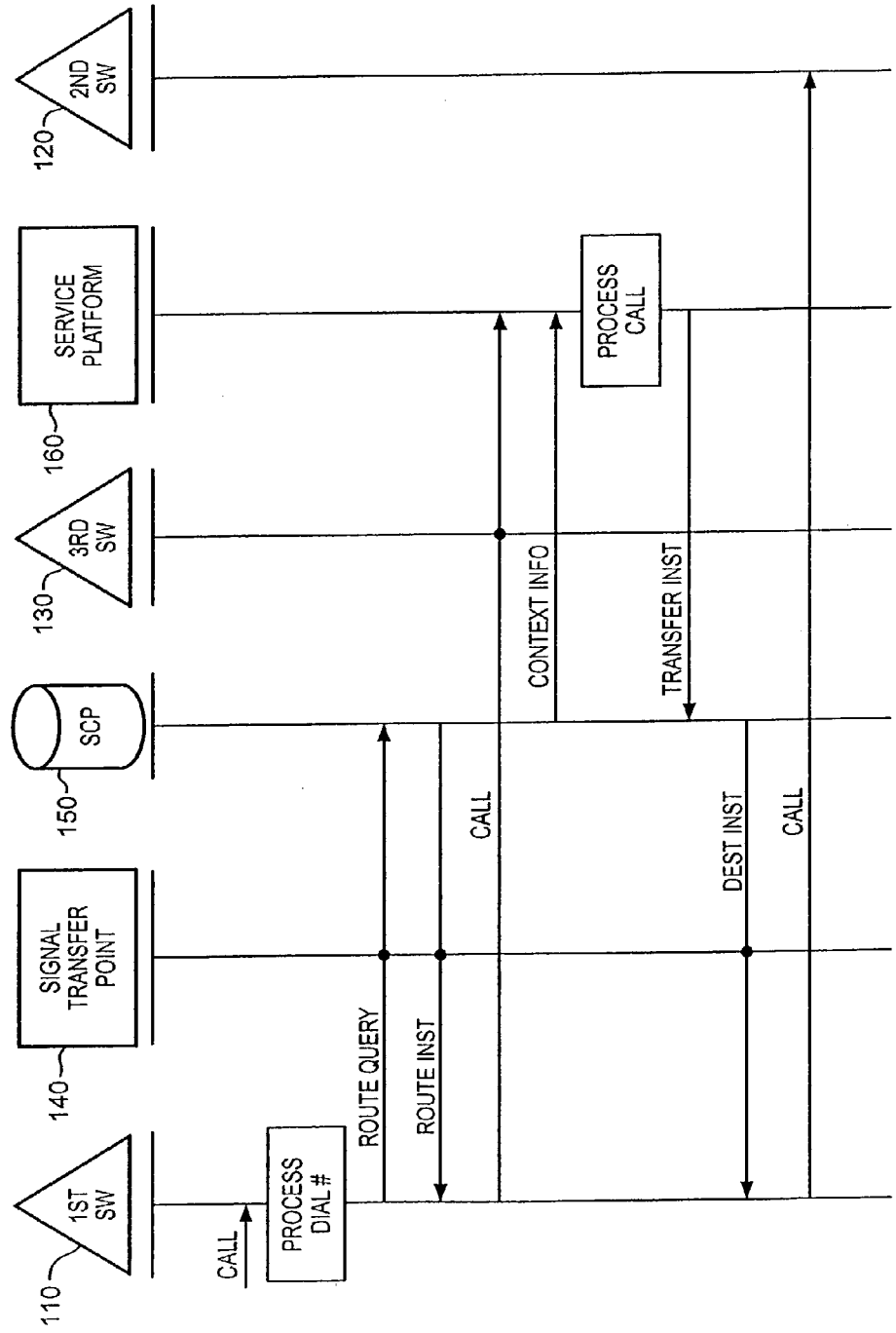
FIG. 4 is a message sequence chart for a prior solution of "connect to resource" call processing services.
Figure 5:
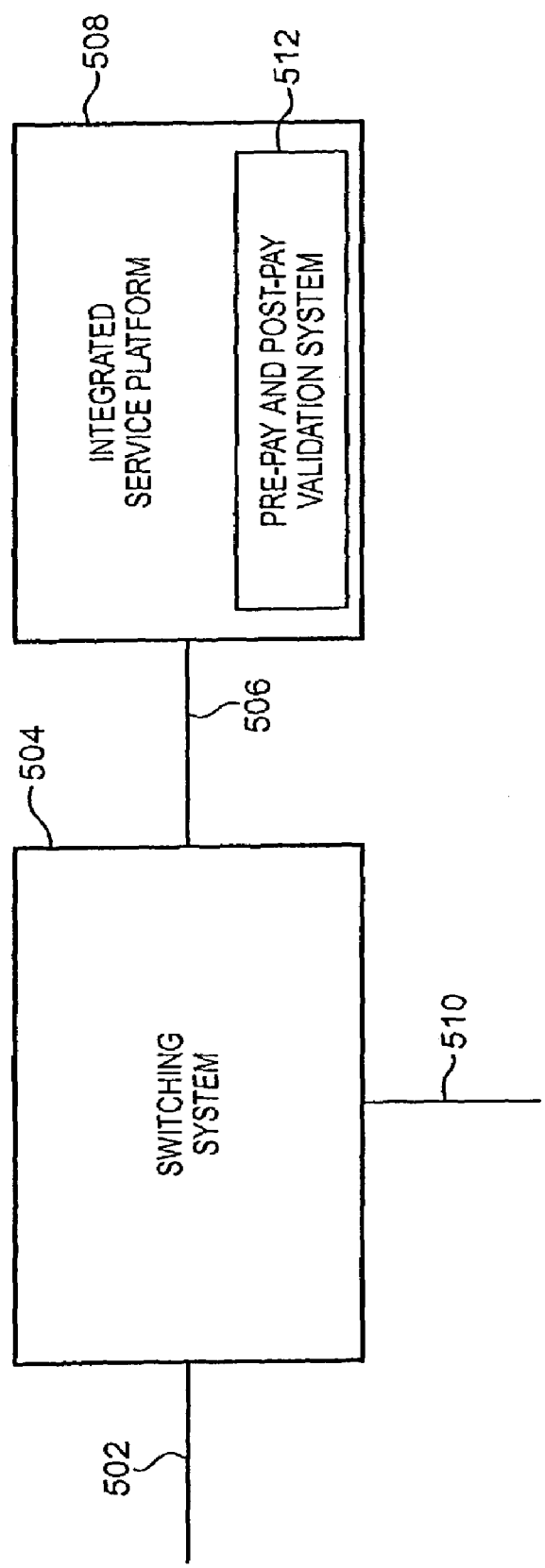
FIG. 5 is system level block diagram in an example of the present invention.
Figure 6:
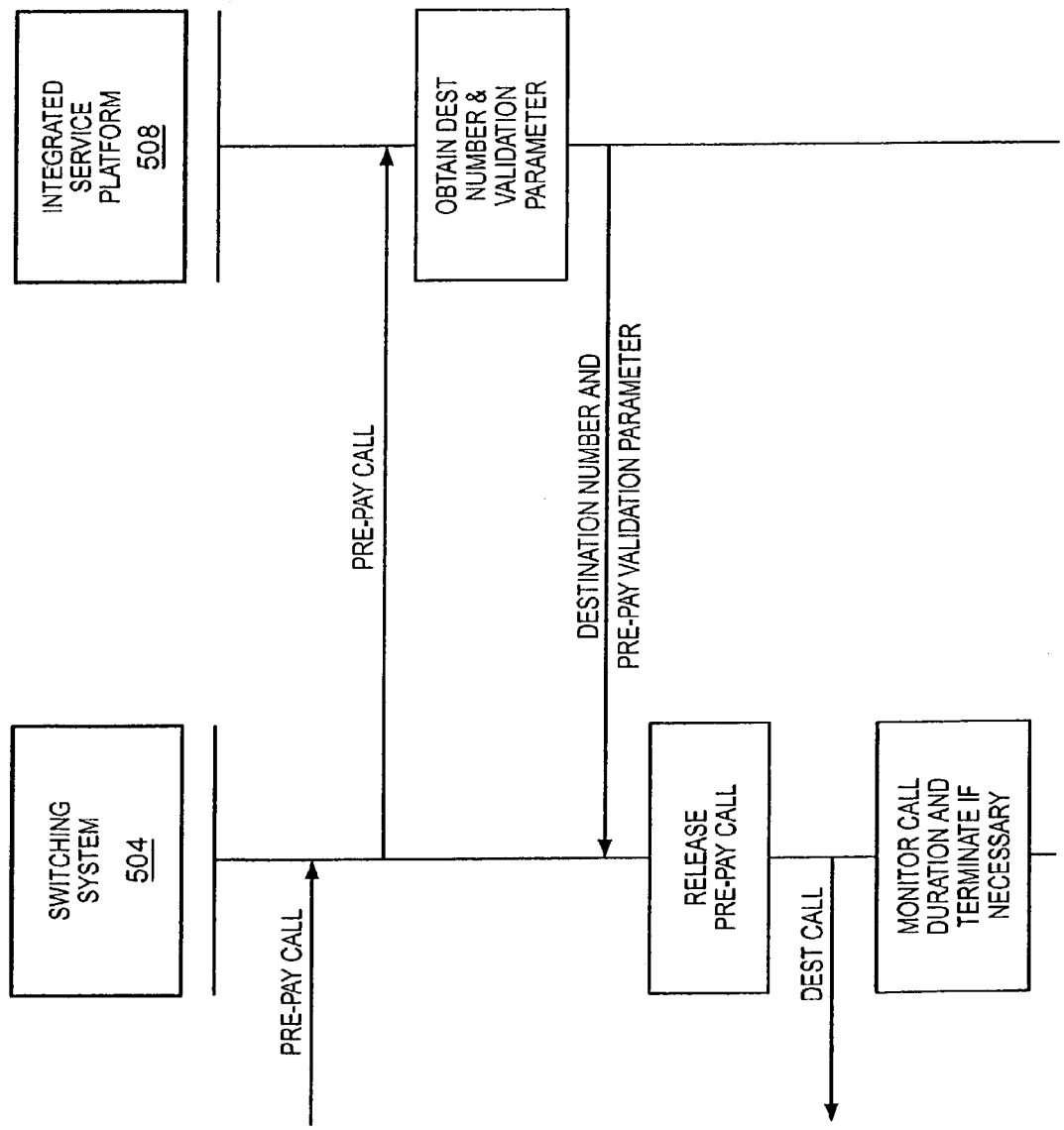
FIG. 6 is a message sequence chart for the operation of a pre-pay calling card service in an example of the invention.
Figure 7:
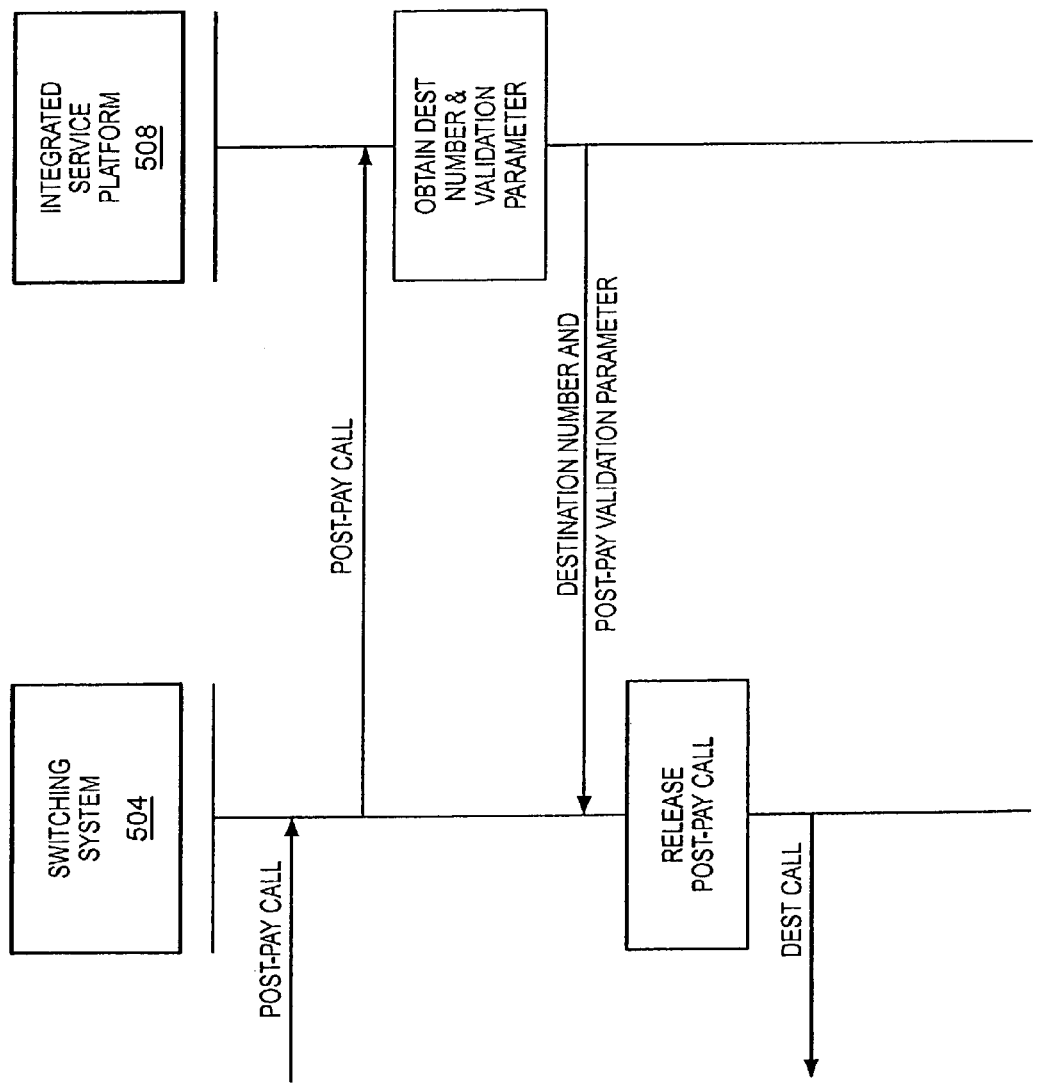
FIG. 7 is a message sequence chart for a post-pay calling card service in an example of the invention.

Pre-Pay And Post-Pay Call System—FIGS. 5-7

FIG. 5 depicts a block diagram in an example of the present invention. A link 502 is connected to a switching system 504. The switching system 504 is connected to an integrated service platform 508 via a link 506. The integrated service platform 508 includes a pre-pay and post-pay validation system 512. A link 510 is also connected to the switching system 504.

The switching system 504 could be a conventional communication switch configured in accord with the invention. The switching system 504 receives calls and extends the calls to the integrated service platform 508. The switching system 504 then receives a destination number and a validation parameter generated by the integrated service platform 508 and releases the call extension to the integrated service platform 508. For pre-pay calls, the switching system 504 extends the pre-pay call using the pre-pay destination number, monitors a duration of the pre-pay call, and terminates the pre-pay call if the duration exceeds a pre-pay amount indicated by the pre-pay validation parameter. For post-pay calls, the switching system 504 releases the post-pay call extension to the integrated service platform 508, and extends the post-pay call using the post-pay destination number if the post-pay validation parameter allows the post-pay call.

The integrated service platform 508 could be a conventional communication system configured in accord with the invention. The integrated service platform 508 receives calls from the switching system 504. The integrated service platform 508 obtains the destination number and the validation parameter for the call. The integrated service platform 508 then transfers the destination number and the validation parameter to the switching system 504. The pre-pay and post-pay validation system 512 validates the pre-pay account code and the post-pay account codes. In other embodiments of the invention, the pre-pay and post-pay validation system 512 is separate from the integrated service platform 508.

FIG. 6 depicts a message sequence chart for the operation of a pre-pay calling card service in an example of the invention. In FIG. 6, the switching system 504 receives the pre-pay call via the link 502. The switching system 504 then extends the pre-pay call to the integrated service platform 508 via the link 506. Upon receiving the pre-pay call, the integrated service platform 508 obtains the pre-pay destination number and the pre-pay validation parameter for the pre-pay call. The integrated service platform 508 transfers the pre-pay destination number and the pre-pay validation parameter to the switching system 504 via the link 506. After receiving the pre-pay destination number and the pre-pay validation parameter, the switching system 504 releases the pre-pay call extension to the integrated service platform 508. The switching system 504 then extends the call using the pre-pay destination number through the link 510. As the pre-pay call is in progress, the switching system 504 monitors the duration of the pre-pay call. If the duration exceeds the pre-pay amount indicated by the pre-pay validation parameter, the switching system 504 terminates the pre-pay call.

FIG. 7 depicts a message sequence chart for the operation of a post-pay calling card service in an example of the invention. In FIG. 7, the switching system 504 receives the post-pay call via the link 502. The switching system 504 then extends the post-pay call to the integrated service platform 508 via the link 506. Upon receiving the post-pay call, the integrated service platform 508 obtains the post-pay destination number and the post-pay validation parameter for the post-pay call. The integrated service platform 508 transfers the post-pay destination number and the post-pay validation parameter to the switching system 504 via the link 506. After receiving the post-pay destination number and the post-pay validation parameter, the switching system 504 releases the post-pay extension to the integrated service platform 508. The switching system 504 then extends the call using the post-pay destination number through the link 510 if the post-pay validation parameter allows the post-pay call.

Figure 8:
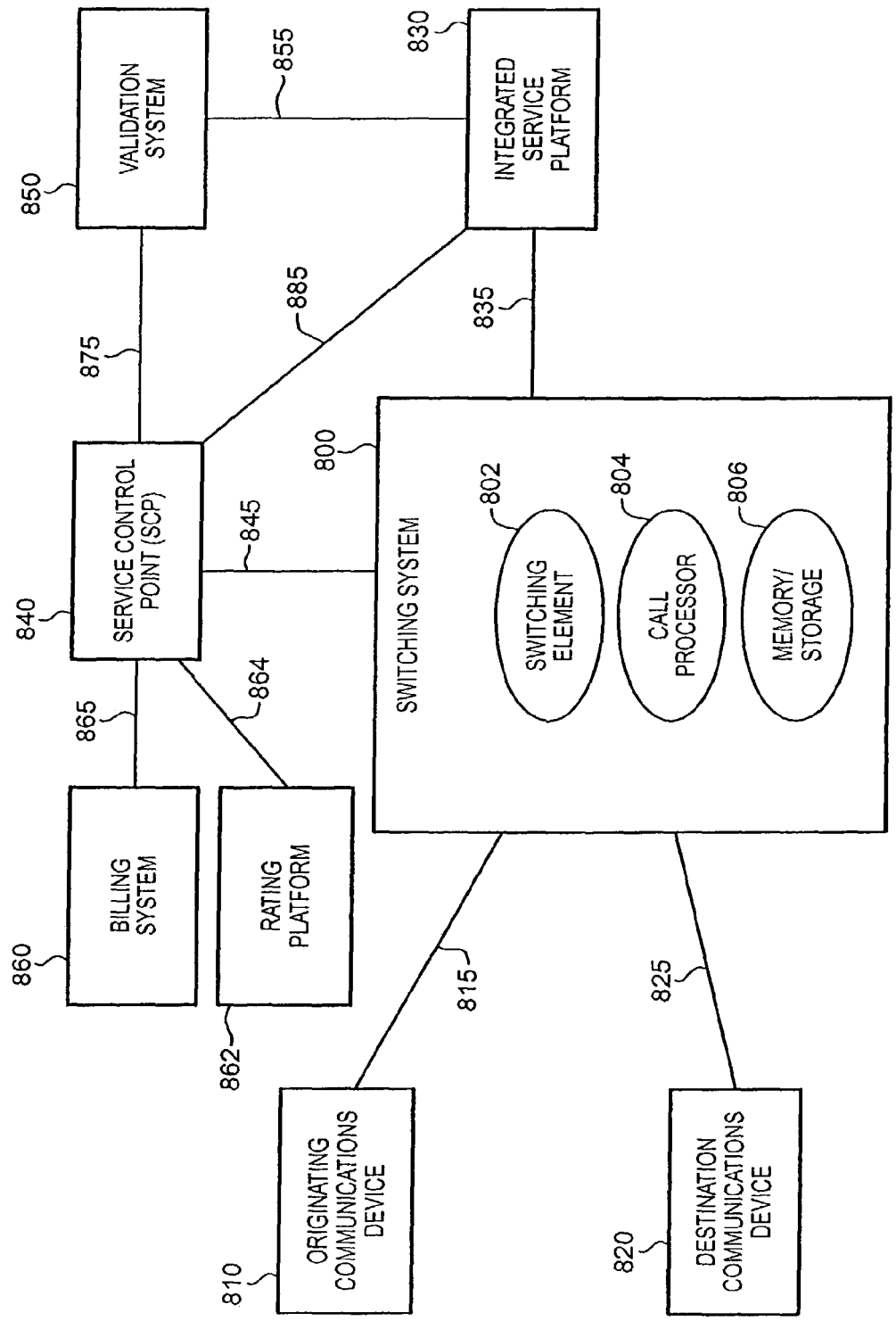
FIG. 8 is a system level block diagram for a system including a billing system and a validation system in an example of the invention.
Figure 9:
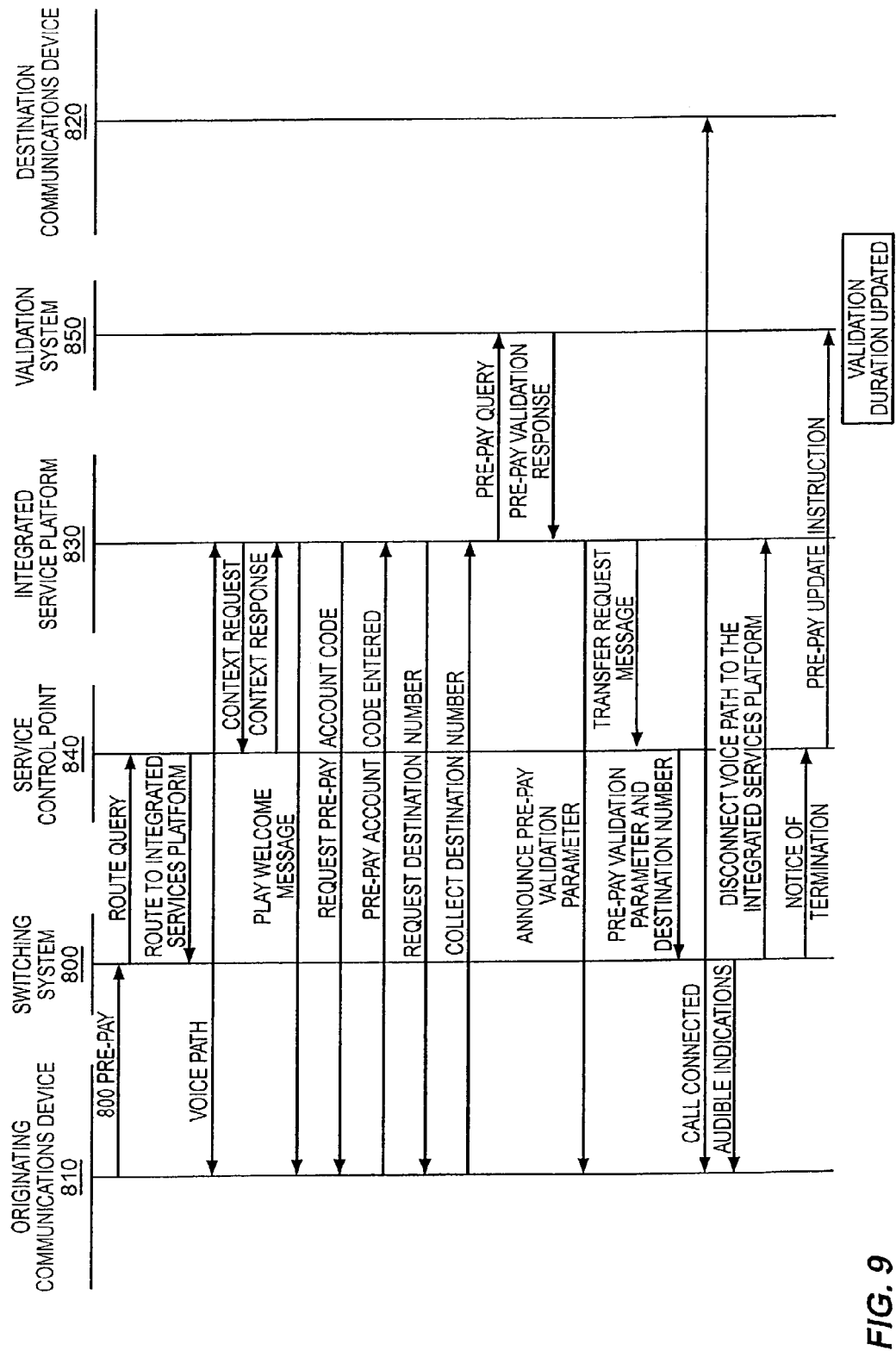
FIG. 9 is a message sequence chart for the operation of a pre-pay calling card service for a system including a billing system and a validation system in an example of the invention.
Figure 10:
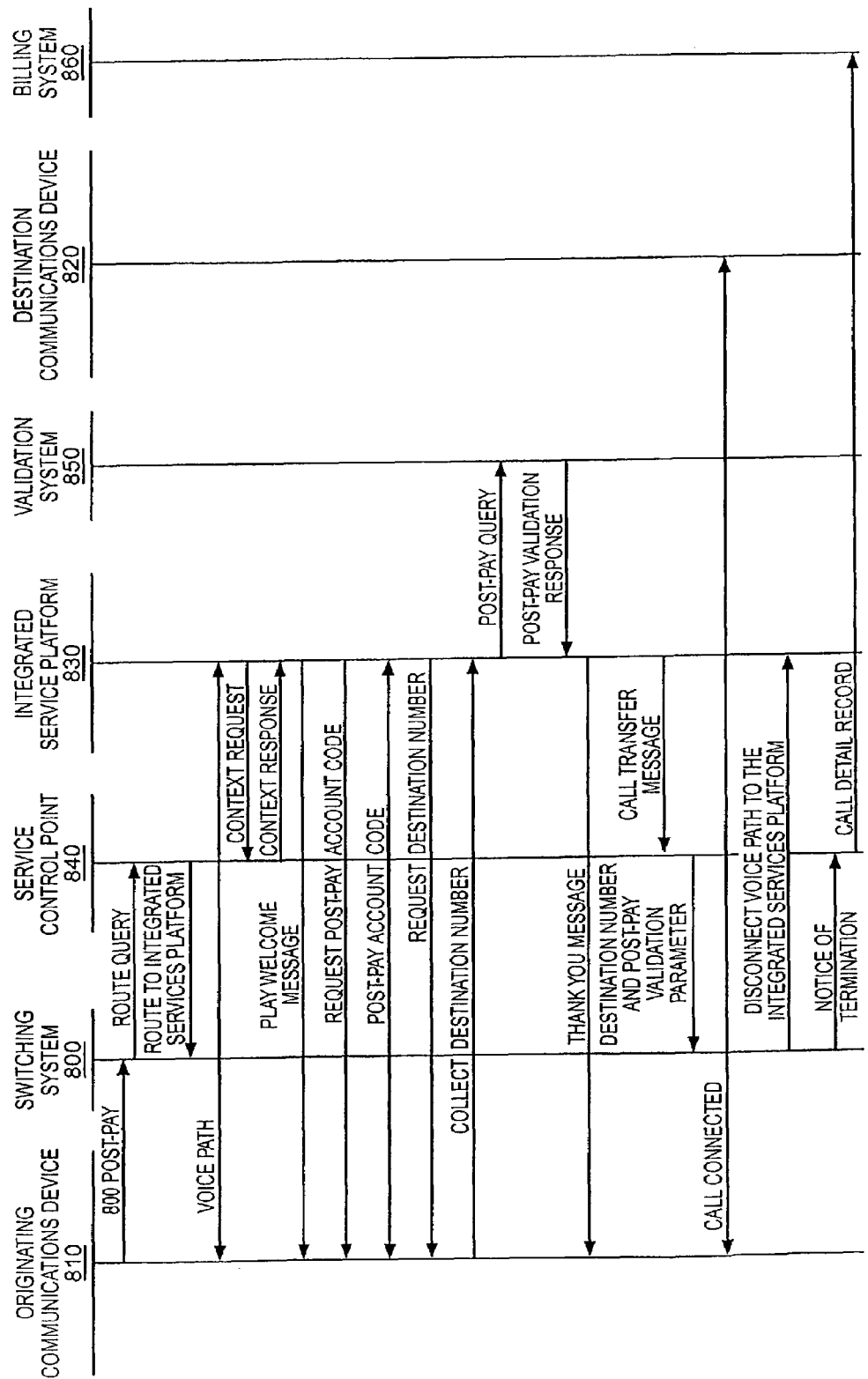
FIG. 10 is a message sequence chart for the operation of a post-pay calling card service for a system including a billing system and a validation system in an example of the invention.

Pre-Pay And Post-Pay Call System with Billing System and Validation System—FIGS. 8-10

FIGS. 8-10 disclose one embodiment of the invention, but the invention is not restricted to the configuration provided below. Those skilled in the art will appreciate numerous variations in pre-pay and post-pay call system configuration and operation that are within the scope of the invention. Those skilled in the art will also appreciate how the principles illustrated in this example can be used in other examples of the invention. A particular reference number in one figure refers to the same element in all of the other figures.

In FIG. 8, illustrated is an embodiment of the present invention which comprises a switching system 800, an originating communication device 810, a destination communication device 820, an integrated service platform 830, a service control point (SCP) 840, a validation system 850, and a rating platform 862. In addition, the first embodiment optionally includes a billing system 860 for performing billing functionality in the case of post-pay calls.

As illustrated, switching system 800 includes a switching element 802, a call processor 804, and some memory/storage 806 for maintaining instructions and data readable by call processor 804. As would be understood by one skilled in the art, the presented invention is not limited to a particular switching system; rather, many different switching system configurations are possible in keeping with the scope and spirit of the present invention.

Switching system 800 is connected to originating communication device 810 via link 815, and to destination communication device 820 via link 825. The present invention presents links 815 and 825 as a single line for simplification purposes. As would be apparent to one skilled in the art, links 815 and 825 typically comprise many different elements such as transmission and switching systems. The present invention does not require origination communication device 810 be directly connected switching system 800. Furthermore, although not required by the present invention, there are cost advantages in making switching system 800 the originating switching system for the call. Similarly, there is no requirement that destination communication device 820 be directly connected to switching system 800. Rather, in most calls provided according to the present invention, destination communication device 820 will be connected to another switching system interconnected to switching system 800 via a public switched, cellular, or private telephone network, or some combination of these networks.

As illustrated in FIG. 8, switching system 800 is further connected to service control point 840 via link 845, and to integrated service platform 830 via link 835. Integrated service platform 830 and service control point 840 are additionally connected to validation system 850 via links 855 and 875, respectively. In addition, service control point 840 is connected to billing system 860 via link 865. Service control point 840 is connected to rating platform 862 via link 864. Service control point 840 is connected to integrated service platform 830 via link 885. In an embodiment, links 845, 855, 864, 865, and 875 comprise one or more signaling networks, such as a Signaling System 7 (SS7) or TCP/IP data network. Additionally, link 835 typically includes one or more voice trunks for providing a voice path for a call between the originating communication device 810 and the integrated service platform 830.

In FIGS. 9 and 10, illustrated are message sequence charts depicting the flow of signaling messages in one or more embodiments of the present invention. The operation of an embodiment for providing pre-pay calls is now further described with reference to the message sequence chart illustrated in FIG. 9. The operation of an embodiment for providing post-pay calls is then described with reference to the message sequence chart illustrated in FIG. 10.

In FIG. 9, originating communication device 810 initiates a pre-pay call to switching system 800. Preferably, the pre-pay communication service is accessed by dialing a predetermined "800" telephone number (e.g., 1-800-xxx-xxxx, 1-888-xxx-xxxx). Switching system 800 recognizes the "800" type call, and sends a route query to service control point 840 requesting call handling information. Service control point 840 returns a route instruction including the network address of integrated service platform 830. A voice path is then established between originating communication device 810 and integrated service platform 830. For simplicity, messages to any intervening network elements between switching system 800 and integrated service platform 830 are not described in FIG. 9.

Next, integrated service platform 830 requests context information from service control point 840 and receives this context information. This context information includes a call-leg count that indicates the number of call-legs that are successfully established. For example, a connection from the switching system 800 to the integrated service platform 830 represents one call-leg, and a connection from the switching system 800 to destination communication device 820 represents a second call-leg. The present invention allows several call-legs to be added and dropped during a single call.

Integrated service platform 830 then plays a welcome message and prompts the originating caller to enter a pre-pay account code. The pre-pay account code is then received by integrated service platform 830 from originating communication device 810. Integrated service platform 830 then prompts for and receives the destination telephone number corresponding to the destination communication device 820. In parallel with or subsequent to the request for the destination telephone number, the integrated service platform 830 sends a pre-pay query to the validation system 850 with the received pre-pay account code, and a pre-pay validation response is returned to the integrated service platform 830. This pre-pay validation response typically contains an indication whether the pre-pay account code is currently valid or not; and if the user is authorized, then the message contains a pre-pay validation parameter. The pre-pay validation parameter may indicate a monetary value or a period of time. In an embodiment, the pre-pay validation parameter is announced to the originating caller. For example, an audible announcement is played to the originating caller indicating the time, monetary duration, or credit available for the pre-pay call.

The integrated service platform 830 passes a transfer request message indicating the pre-pay validation parameter and the telephone number of the destination communication device 820 to the service control point 840, which relays, and possibly reformats to a transfer instruction, this information to switching system 800.

In one embodiment of the invention, service control point 840 transmits a query with the pre-pay validation parameter to rating platform 862 for a cost per minute table to determine how many minutes a call can be in progress before exceeding an available dollar amount. The rating platform 862 then transmits a response including the calculated remaining minutes to switching system 800 via link 864, service control point 840, and link 845. The rating platform 862 may also receive update instructions to update the rating information for an account.

Switching system 800 then extends the pre-pay call through the communication network so the pre-pay call is connected between the originating communication device 810 and the destination communication device 820. Switching system 800 then monitors the pre-pay call. Optionally, and preferably, switching system 800 imparts an audible indication identifying when the duration of the pre-pay call approaches the duration limit. For example, switching system 800 might use voice synthesis technology to state that there is "two minutes left", "one minute left", and "time expired;" or alternatively, various audible tones are used as duration indicators.

After the pre-pay validation parameter has been announced, the voice path between the originating communication device 810 and the integrated service platform 830 is disconnected, as the present invention does not require this resource to be unnecessarily tied up for the call duration as required by previous systems. Typically, the voice path between the originating communication device 810 and the integrated service platform 830 is disconnected in parallel with operation of connecting the pre-pay call and performance of other operations.

When the duration of the pre-pay call reaches or exceeds a pre-pay amount indicated by the received pre-pay validation parameter, switching system 800 terminates the pre-pay call. Communication switch 800 sends a notice of termination to the service control point 840. Communication switch 800 also sends a notice of termination to the service control point 840 when the pre-pay call terminates normally. Service control point 840 updates the pre-pay validation parameter with the duration of the pre-pay call and transmits a pre-pay update instruction including the pre-pay validation parameter and the pre-pay account code to validation system 850. Service control point 840 prepares a standard call detail record and sends this message to billing system 860. Validation system 850 then updates its database to reflect the new pre-pay validation parameter and the pre-pay account code.

Referring now to FIG. 10, originating communication device 810 initiates a post-pay call to switching system 800. Preferably, the post-pay communication service is accessed by dialing a predetermined "800" telephone number (e.g., 1-800-xxx-xxxx, 1-888-xxx-xxxx). Switching system 800 recognizes the "800" type call, and sends a route query to service control point 840 requesting the network address (i.e., phone number) of integrated service platform 830. Service control point 840 returns a route instruction including this network address. A voice path is then established between originating communication device 810 and integrated service platform 830. For simplicity, messages to any intervening network elements between switching system 800 and integrated service platform 830 are not described in FIG. 10.

Next, integrated service platform 830 requests context information from service control point 840 and receives this context information. This context information includes a call-leg count that indicates the number of call-legs that are successfully established. For example, a connection from the switching system 800 to the integrated service platform 830 represents one call-leg, and a connection from the switching system 800 to destination communication device 820 represents a second call-leg. The present invention allows several call-legs to be added and dropped during a single call.

Integrated service platform 830 then plays a welcome message and prompts the originating caller to enter an authorized post-pay account code. The post-pay account code is then received by integrated service platform 830 from originating communication device 810. Integrated service platform 830 then prompts for and receives the destination telephone number corresponding to the destination communication device 820. In parallel with or subsequent to the request for the destination telephone number, the integrated service platform sends a post-pay query to the validation system 850 with the received post-pay account code, and a post-pay validation response is returned to the integrated service platform 830. This post-pay validation response typically contains an indication whether the post-pay account code is currently valid or not.

In an optional embodiment, the post-pay validation response additionally contains a post-pay credit parameter which is used like a pre-pay validation parameter for pre-pay calls as previously described herein. In this case, switching system 800 would similarly monitor the call duration, provide the audible indication messages, and terminate the post-pay call when the authorized service duration is reached or exceeded.

The integrated service platform 830 passes a transfer request message indicating the telephone number of the destination communication device 820 to the service control point 840, which relays, and possibly reformats to a transfer instruction, this information to switching system 800. Switching system 800 then extends the post-pay call through the communication network so the post-pay call is connected between the originating communication device 810 and the destination communication device 820.

After, or in parallel with the completion of the post-pay call, the voice path between the originating communication device 810 and the integrated service platform 830 is disconnected, as the present invention does not require this resource to be unnecessarily tied up for the call duration as required by previous systems. When the post-pay call is terminated (e.g., the originating communication device 810 or destination communication device 820 goes on-hook), communications switch 800 sends a notice of termination to the service control point 840. Service control point 840 prepares a standard call detail record and sends this message to billing system 860. Billing systems for processing and invoicing customers are well-known in the art.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of providing calls using an integrated service platform, the method comprising:
   receiving a call into a switching system;
   extending the call from the switching system toward the integrated service platform;
   in the integrated service platform, obtaining a destination number and a validation parameter for the call;
   transferring the destination number and the validation parameter from the integrated service platform to the switching system;
   in the switching system, releasing the call extension to the integrated service platform and extending the call using the destination number;
   in the switching system, monitoring a duration of the call; and
   in the switching system, terminating the call if the call is a pre-pay call and if the duration meets or exceeds an amount indicated by the validation parameter.

2. The method of claim 1 further comprising:
   in the integrated service platform, collecting an account code for the call; and
   in the integrated service platform, querying an integrated validation database with the account code to obtain the validation parameter.

3. The method of claim 1 further comprising:
   in the integrated service platform, playing a message for the call based on a called number.

4. The method of claim 1 further comprising:
   in the integrated service platform, playing a message for the call based on a caller number.

5. The method of claim 1 further comprising:
   updating the validation parameter with the duration of the call;
   generating an update instruction including the validation parameter; and
   transmitting the update instruction for an integrated validation database.

6. The method of claim 1 further comprising:
   generating a call detail record for the call; and
   transmitting the call detail record for a billing system.

7. The method of claim 1 wherein receiving the call into the switching system further comprises:
   transmitting a route query for a service control point indicating the received call; and
   receiving a routing instruction from the service control point for the integrated service platform.

8. The method of claim 1 wherein transferring the destination number and the validation parameter from the integrated service platform to the switching system further comprises:
   in the integrated service platform, generating and transmitting a transfer request message for a service control point;
   receiving the transfer request message into the service control point;
   in the service control point, generating and transmitting a transfer instruction for the switching system to release the call extension from the switching system to the integrated service platform and extend the call using the destination number; and
   receiving the transfer instruction into the switching system.

9. The method of claim 1 further comprising transmitting a notice of termination to a service control point when the call is terminated.

10. The method of claim 1 further comprising querying a rating platform with the validation parameter in order to obtain a cost-per-minute rating for the call.

11. The method of claim 1 wherein the call is a pre-pay call and wherein the validation parameter comprises a period of time.

12. The method of claim 1 wherein the call is a pre-pay call and wherein the validation parameter comprises a monetary value.

13. The method of claim 1 wherein the call is a pre-pay call and further comprising imparting an audible indication to the call to indicate the duration of the call has reached a predetermined threshold duration value that is less than the amount indicated by the validation parameter.

14. The method of claim 1 wherein the call is a pre-pay call and further comprising imparting an audible indication to the call to indicate a remaining credit for an account.

15. The method of claim 1 wherein the call is a post-pay call and further comprising:
   in the switching system, monitoring the duration of the call and terminating the call if the duration meets or exceeds a amount indicated by the validation parameter.

16. The method of claim 15 wherein the call is a post-pay call and wherein the validation parameter corresponds to a predetermined credit limit.

17. A communication system for providing calls using an integrated service platform, the communication system comprising:
   a switching system that is configured to receive a call, extend the call toward the integrated service platform, release the call extension to the integrated service platform, extend the call using a destination number, monitor a duration of the call, and terminate the call if the call is a pre-pay call and if the duration meets or exceeds an amount indicated by a validation parameter; and
   the integrated service platform that is configured to obtain the destination number and the validation parameter for the call and transfer the destination number and the validation parameter to the switching system.

18. The communication system of claim 17 wherein the integrated service platform is configured to collect an account code for the call and query an integrated validation database with the account code to obtain the validation parameter.

19. The communication system of claim 18 wherein the integrated service platform is configured to generate and transmit a transfer request message for a service control point and the switching system is configured to receive the transfer instruction, the communication system further comprising:

a service control point configured to receive the transfer request message and generate and transmit a transfer instruction for the switching system to release the call extension from the switching system to the integrated service platform and extend the call using the destination number.

20. The communication system of claim 17 wherein the integrated service platform is configured to play a message for the call based on a called number.

21. The communication system of claim 17 wherein the integrated service platform is configured to play a message for the call based on a caller number.

22. The communication system of claim 17 wherein the switching system is configured to transmit a notice of termination to a service control point when the call is terminated.

23. The communication system of claim 17 wherein the switching system is configured to update the validation parameter with the duration of the call, generate a update instruction including the validation parameter, and transmit the update instruction for an integrated validation database.

24. The communication system of claim 17 wherein the switching system is configured to generate a call detail record for the call and transmit the call detail record for a billing system.

25. The communication system of claim 17 wherein the switching system is configured to transmit a route query for a service control point indicating the received call and receive a routing instruction from the service control point for the integrated service platform.

26. The communication system of claim 17, the communication system further comprising:

a service control point configured to receive a notice of termination.

27. The communication system of claim 17 wherein the call is a pre-pay call and wherein the validation parameter comprises a period of time.

28. The communication system of claim 17 wherein the call is a pre-pay call and wherein the validation parameter comprises a monetary value.

29. The communication system of claim 17 wherein the call is a pre-pay call and wherein the switching system is configured to impart an audible indication to the call to indicate the duration of the call has reached a predetermined threshold duration value that is less than the amount indicated by the validation parameter.

30. The communication system of claim 29 wherein the call is a pre-pay call and wherein the switching system is configured to receive the predetermined threshold duration value.

31. The communication system of claim 17 wherein the call is a pre-pay call and wherein the switching system is configured to impart an audible indication to the call to indicate a remaining credit for an account.

32. The communication system of claim 17 wherein the call is a post-pay call and wherein the switching system is configured to monitor the duration of the call and terminate the call if the duration meets or exceeds an amount indicated by the validation parameter.

33. The communication system of claim 17 wherein the call is a post-pay call and wherein the validation parameter corresponds to a predetermined credit limit.

* * * * *